Figure 1:
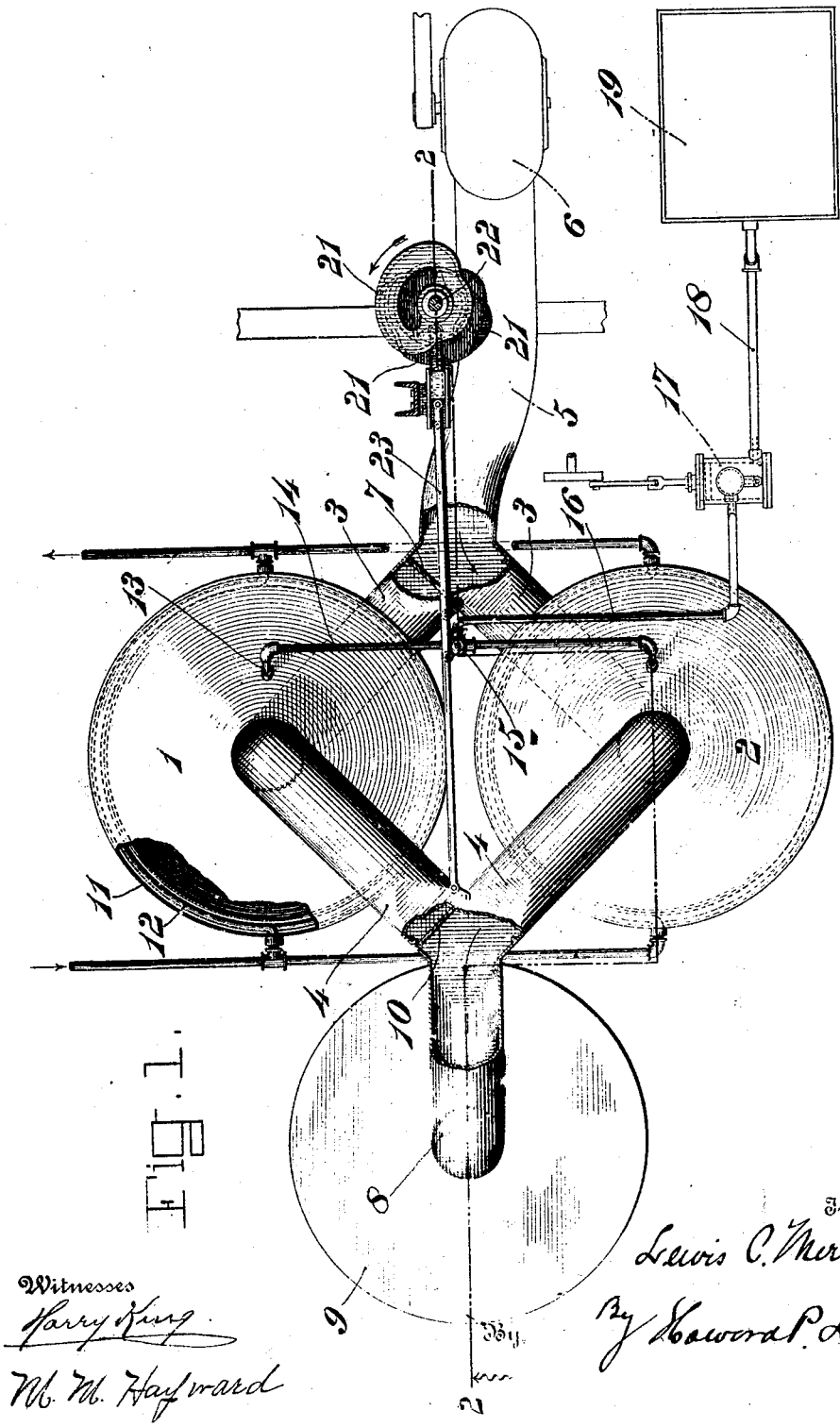

L. C. MERRELL.
APPARATUS FOR DESICCATING.
APPLICATION FILED APR. 29, 1911.

1,082,468.

Patented Dec. 23, 1913.
4 SHEETS—SHEET 1.

Witnesses
Harry King
M. M. Hayward

Inventor
Lewis C. Merrell
By Howard P. Denison
Attorney

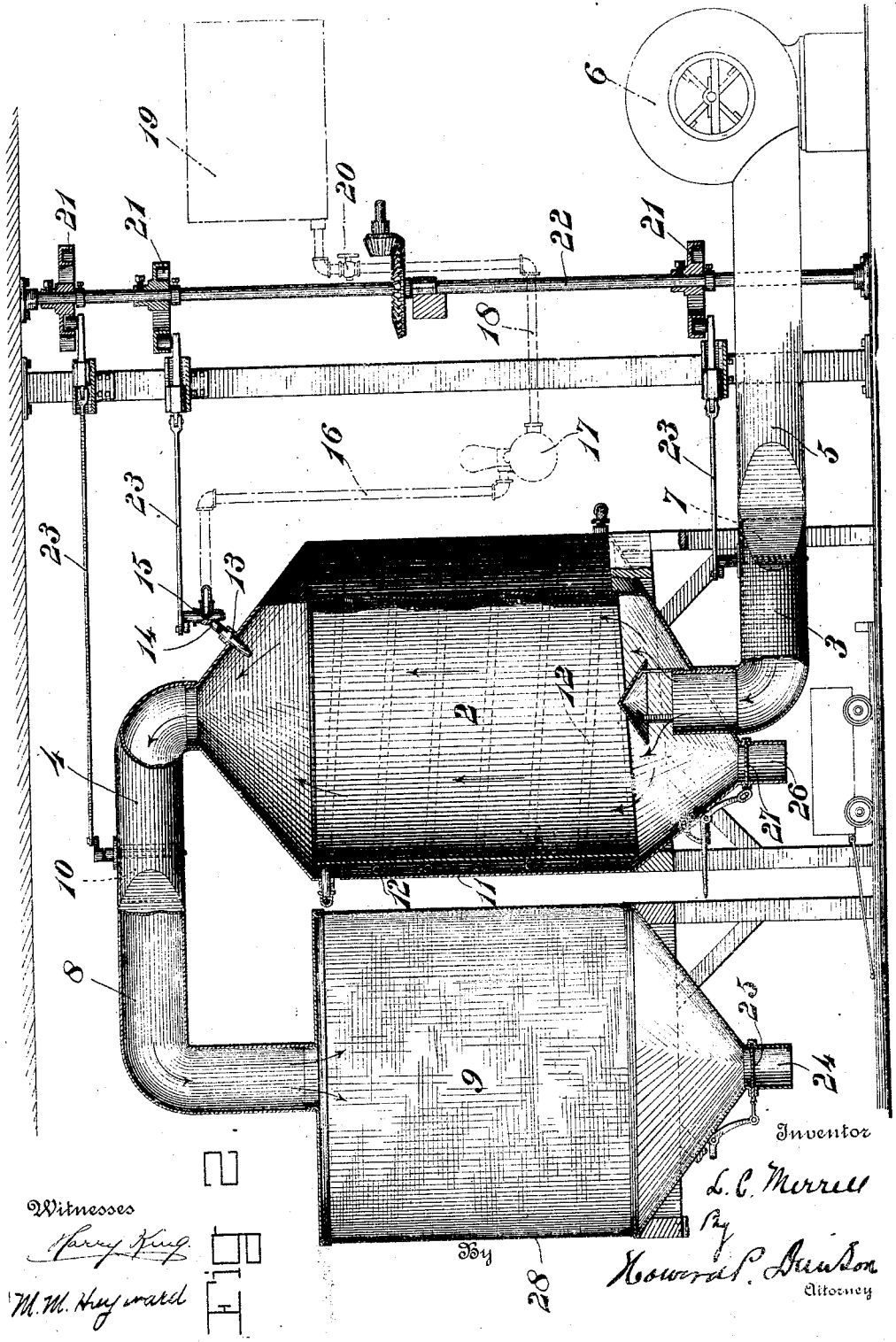

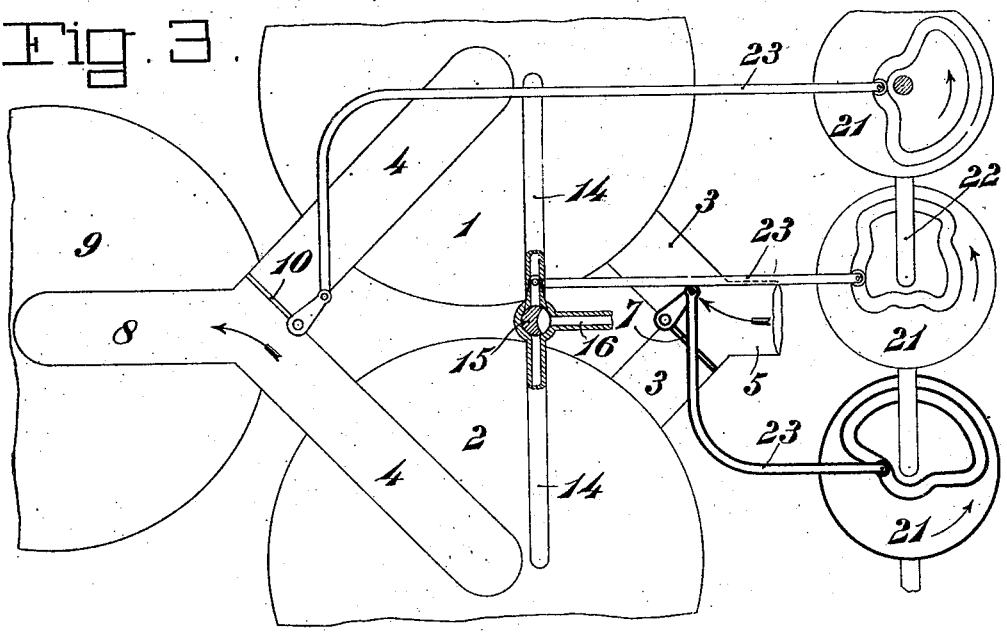
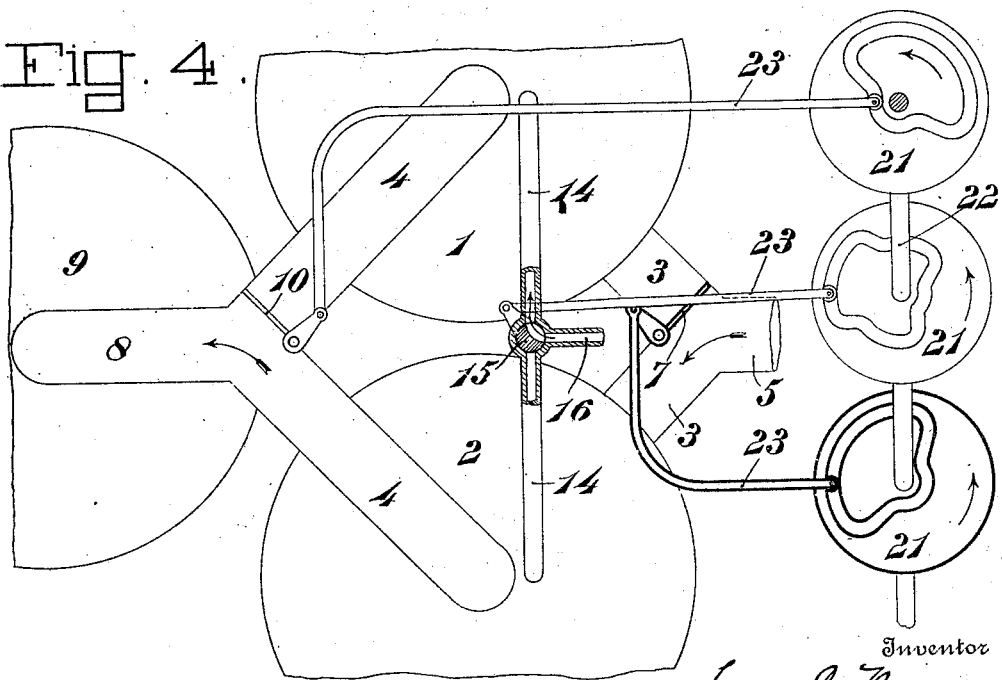

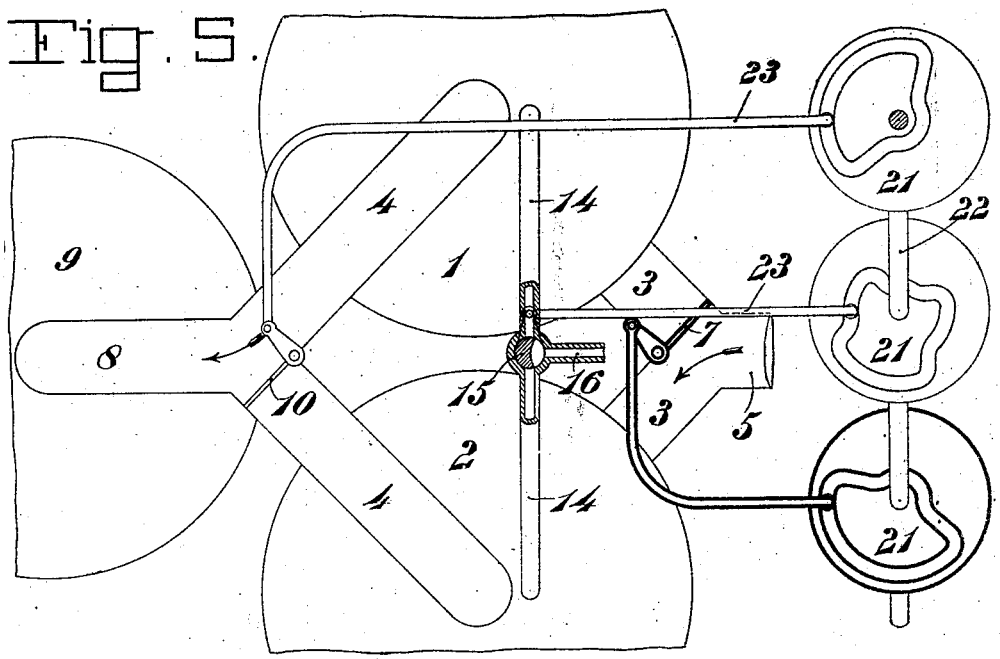
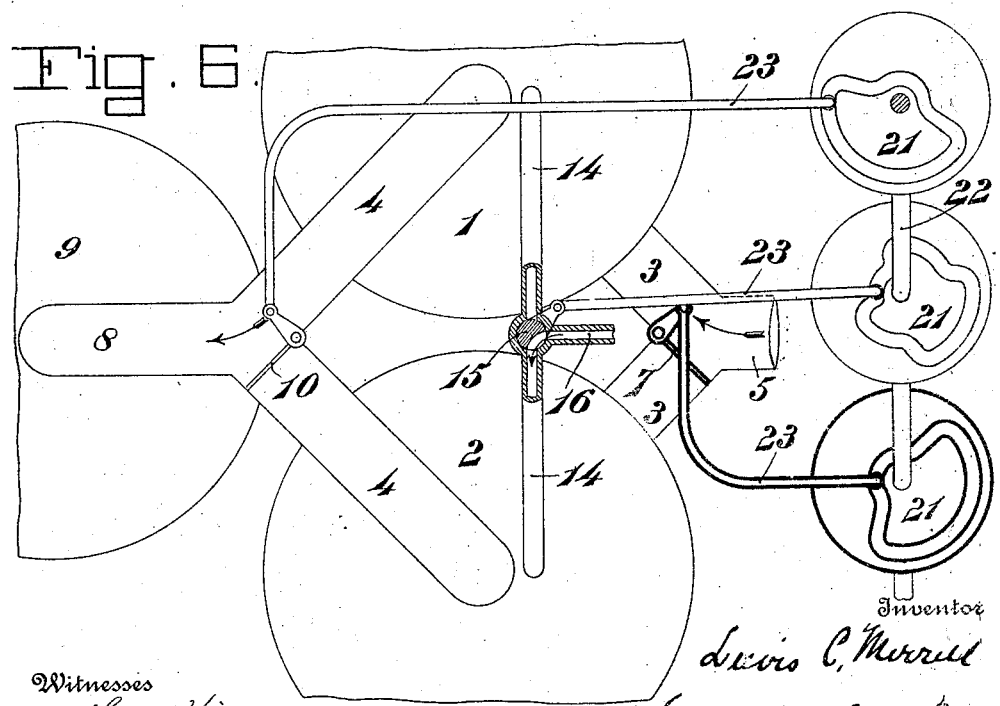

UNITED STATES PATENT OFFICE.

LEWIS C. MERRELL, OF SYRACUSE, NEW YORK, ASSIGNOR TO MERRELL-SOULE COMPANY, OF SYRACUSE, NEW YORK, A CORPORATION OF NEW YORK.

APPARATUS FOR DESICCATING.

1,082,468.  Specification of Letters Patent.  Patented Dec. 23, 1913.

Application filed April 29, 1911. Serial No. 624,186.

*To all whom it may concern:*

Be it known that I, LEWIS CHARLES MERRELL, of Syracuse, Onondaga county, New York, have invented an Apparatus for Desiccating, of which the following is a specification.

This invention relates to improvements in an apparatus for separating the moisture from the constituent solids of liquids, and is more particularly related to the process covered by Letters Patent of the United States No. 860,929, granted jointly to myself, Irving S. Merrell and William B. Gere, and dated July 23, 1907.

Briefly stated, the process of the patent above mentioned contemplates the treatment of liquids and semi-liquids, such as milk, by first concentrating the same to deprive the substances of a large percentage of the moisture contained therein. The mass so concentrated is then converted into a fine spray, and in this form it is subjected to a desiccating agent, such as a current of dry air or gas, the temperature of which may be regulated, whereby to extract from the concentrated mass substantially all the remaining liquid constituents. During the treatment of the sprayed mass by the air or gas, the latter takes up the moisture remaining after concentration, leaving the solid constituents in the form of a dry powder, and this powder is collected in a suitable space away from the air or gas current, the air or gas being discharged separately from the dry powder.

The process of the patent aforesaid may be termed a continuous process, that is to say, the liquid or semi-liquid is treated while in transit, and in its action upon the liquid or semi-liquid the desiccating agent is also in transit. Hence, neither the liquid or semi-liquid nor the desiccating agent remains for any appreciable time in the desiccating chamber, and the separation of the moisture remaining takes place while the sprayed mass and the desiccating agent are in transit.

The present invention, as distinguished from the process above described, contemplates an apparatus wherein the desiccating agent, as a body of air, is admitted to the desiccating chamber, and when the desired quantity has been so introduced the supply is cut off and the agent confined in said chamber. The substance to be treated is then introduced to the desiccating chamber until the proper quantity, proportioned to the amount of the confined desiccating agent, has entered the chamber, whereupon the flow of the substance is stopped. Evaporation takes place, the solid constituents being deprived of their moisture and becoming reduced to the condition of a fine dry dust. The moisture-laden air is then discharged into a dust collector wherein separation of the air and the dry solids is effected.

As a subordinate feature of the present invention, the same also contemplates an apparatus of the character recited wherein the flow of the desiccating agent and substance to be treated, at periodic stages, is cut off and deflected successively to a plurality of desiccating chambers arranged in battery form, and timed in proper relation to each other to be charged and discharged, thereby increasing materially the output obtained by the practice of the process.

In the drawings Figure 1 is a top plan view, partly in section, of a novel apparatus which is designed to carry into effect the herein-described process. Fig. 2 is a vertical sectional view thereof on the line 2—2, Fig. 1, certain portions of the apparatus appearing in elevation. Figs. 3 to 6, inclusive, are diagrammatic views illustrative of certain steps of the process.

It will be understood that the practice of the herein-described process is not limited to any particular form or type of apparatus, and hence the apparatus illustrated in the accompanying drawings is merely indicative of one type which may be employed.

Referring to the drawings, 1 and 2 are a pair of desiccating chambers, which are arranged in battery form, any number of these chambers being employed, and each being provided with an inlet pipe 3 and an outlet pipe 4. The inlet pipes 3 are connected to a supply pipe 5, which supply pipe is, in turn, connected with a suitable pressure device 6. As illustrated in the drawings, the pressure device is in the form of a rotary blower, but any device designed for moving air may be substituted therefor. At the juncture of the inlet pipes 3 with the supply pipe 5 is arranged an inlet valve 7. This valve may be of any suitable construction, but it is illustrated as a pivoted gate, and by reason of its location at the point noted it is obvious that said valve will control connection between the inlet pipes 3 and the supply pipe 5. The outlet pipes 4 communicate with a discharge pipe 8, the discharge pipe communicating with a dust collector 9. In the illustration of the latter herein it is shown merely in conventional form. At the juncture of the outlet pipes 4 is arranged an outlet valve 10, which valve is also illustrated as in the form of a pivoted gate, and said valve controls both of the outlet pipes 4 in a manner similar to the control of the inlet pipes 3 by the valve 7.

Each of the desiccating chambers 1 and 2 has a jacket 11, and located in said jacket is a heating coil 12, preferably a steam pipe, whereby the temperature of the contents of the desiccating chamber may be raised, as will be presently described. Each of the desiccating chambers 1 and 2 is also provided with a spraying device 13 for the introduction of the substance to be treated. These spraying devices are in the form of nozzles connected to suitable pipes 14, which pipes 14 are also connected to a three-way valve 15 having communication with a liquid supply pipe 16. The pipe 16 is connected to a high pressure pump 17, and said pump is also connected, by a pipe 18, with a source of liquid supply 19, such as a tank. The pipe 18 is preferably valved, at at 20, to control the supply of the liquid to the pump from the tank 19. The inlet valve 7, the outlet valve 10, and the three-way valve 15 are actuated by suitable cams 21 carried by a driving shaft 22, and connected with said valves through the medium of links 23, and said cams 21 are so proportioned and designed as to cause proper actuation of said valves in proper relation to each other.

The process is practised in the following manner: The blower 6 having been started, steam is turned into the heating coils 12. The outlet valve 10 is then actuated to close the outlet pipe 4 leading from the chamber 1, and at the same time the inlet valve 7 is actuated to open the inlet pipe 3 of said chamber 1 to connection with the supply pipe 5. This causes the air from the blower 6 to enter the chamber 1 under pressure. During the positioning of the valves 7 and 10 in the manner referred to the three-way valve 15 is neutral, the positions of the parts just described being illustrated in Fig. 3. The inlet valve 7 is now closed to cut off communication between the inlet pipe 4 and supply pipe 5, whereby the body of air introduced to the chamber 1 is confined within said chamber. The pump 17 having been started liquid is forced from the tank 19 to the three-way valve 15, which has now been moved to the position shown in Fig. 4, and this results in the flow of the liquid to the spraying device 13 of the chamber 1. After a suitable amount of liquid has entered said chamber 1 the three-way valve 15 is again turned to neutral position, as illustrated in Fig. 5, and thereby cuts off the liquid supply from the chamber 1. At the same time the outlet valve 10 is moved to the position shown in Fig. 5, which establishes communication between the outlet pipe 4 of the chamber 1 and the discharge pipe 8, said valve 10 also cutting off communication between the outlet pipe 4 of the chamber 2 and said discharge pipe. In this position of the parts, however, the inlet valve 7 is in the position illustrated in Fig. 5, cutting off communication between the supply pipe 5 and the inlet pipe 3 of the chamber 1, and establishing communication between said pipe 5 and the inlet pipe 3 of the chamber 2. Air under pressure now enters the chamber 2, and this air is heated by the steam coils of said chamber, as the air introduced to chamber 1 is also heated by the coils of that chamber when so introduced. When the desired quantity of air has been admitted to the chamber 2 the inlet valve 7 is swung to the position illustrated in Fig. 6, and the chamber 1 now being in communication with the supply pipe 5 and the discharge pipe 8, air will enter said chamber 1 from the blower to drive out the moisture-laden air from the chamber 1 and force the same into the dust collector 9, and in the latter the moisture is discharged to atmosphere, while the dust is precipitated in a manner well understood in the art. In the meantime, and as soon as the inlet valve 7 has closed to the position illustrated in Fig. 6, thereby confining the air within the chamber 2, the three-way valve 15 is turned in order to allow the liquid to be sprayed into said chamber 2. A suitable amount of liquid being so introduced, the three-way valve 15 is turned to cut off the liquid supply to the chamber 2, whereupon the inlet valve 7 and the outlet valve 10 are properly actuated to permit the air from the blower to be forced into the chamber 2, and thereby drive out the moisture-laden air into the dust collector 9, in the manner described in connection with chamber 1, thus separating the moisture which has been taken up by the air in the chamber 2 from the solid constituents, and allowing the latter which, as will be observed, are now in the form of a dry powder, to be precipitated in the dust collector.

The dust collector 9 has a discharge spout 24 controlled by a suitable gate 25, through the medium of which the powder connected thereby may be discharged therefrom, and each of the chambers 1 and 2 is also provided with a discharge spout 26 controlled by a gate 27, thus permitting any powder which may be precipitated in said tanks to be readily removed therefrom.

The illustrated dust collector 9, has its cylindrical wall 28 formed of foraminous material, such as textile fabric, which permits the moisture-laden air to pass readily therethrough but prevents passage of the powder.

While capable of wide range of application, the present invention is particularly designed for desiccating unstable complex organic liquids having a high moisture-content, such as milk, eggs, etc.

It will be noted that the liquid is always sprayed into a confined body of air, and that such air is quiescent except for the eddies caused by the incoming spray; and that when the air is in movement while being introduced into each desiccating chamber, and while being forced out therefrom, no liquid is sprayed into the current of air.

I claim:—

1. In a desiccating apparatus, a closed chamber for receiving a moisture-absorbent, means for introducing the moisture-absorbent therein, means for introducing to said chamber the liquid to be treated, and means for effecting a separation of the moisture-laden absorbent from the desiccated product.

2. In a desiccating apparatus, a chamber for receiving a moisture-absorbent, means for introducing a moisture-absorbent therein, means for confining the moisture-absorbent within the chamber, means for introducing to said chamber the liquid to be treated, and means for effecting a separation of the moisture-laden absorbent from the desiccated product.

3. In a desiccating apparatus, a chamber for receiving a moisture-absorbent, means for introducing the moisture-absorbent therein, means for confining the moisture absorbent within the chamber, a spraying device for introducing the liquid to be treated into said chamber in a finely-divided condition, and means for effecting a separation of the moisture-laden absorbent from the desiccated product.

4. In a desiccating apparatus, a chamber for receiving a moisture-absorbent, inlet and outlet conduits for said chamber whereby to introduce and discharge the moisture-absorbent to and from said chamber, means associated with said conduits for confining the moisture-absorbent within the chamber, means for introducing to said chamber the liquid to be treated, and means also associated with the outlet conduit for effecting a separation of the moisture-laden absorbent from the desiccated product.

5. In a desiccating apparatus, a plurality of chambers for receiving a moisture-absorbent, means for introducing the moisture-absorbent to said chambers in regular succession, means also associated with said chambers for introducing to the latter the liquid to be treated, and means for discharging the moisture-laden agent from said chambers in regular succession.

6. In a desiccating apparatus, a plurality of chambers for receiving a moisture-absorbent, means associated with said chambers for alternately charging the latter with the moisture-absorbent, means also associated with said chambers for introducing to the latter the liquid to be treated, and means for alternately discharging said chambers of the moisture-laden agent.

7. In a desiccating apparatus, a plurality of chambers for receiving a moisture-absorbent, means associated with said chambers for alternately charging the latter with the moisture-absorbent, means also associated with said chambers for introducing to the latter the liquid to be treated, means for alternately discharging said chambers of the moisture-laden absorbent, and means for effecting a separation of the moisture-laden absorbent from the desiccated product when the latter is discharged from said chambers.

8. In a desiccating apparatus, a plurality of chambers for receiving a moisture-absorbent, a source of moisture-absorbent-supply for said chambers, means associated with said source of moisture-absorbent-supply for introducing the moisture-absorbent to said chambers in regular succession, means also associated with said chambers for introducing to the latter the liquid to be treated, means for discharging said chambers in regular succession of the moisture-laden absorbent, and means for effecting a separation of the moisture-laden absorbent from the desiccated product as the same is discharged from the chambers.

In witness whereof I have hereunto set my hand on this 27th day of April 1911.

LEWIS C. MERRELL.

Witnesses:
 HOWARD P. DENISON,
 E. F. SPEARING.